United States Patent [19]

Wright et al.

[11] 4,063,803
[45] Dec. 20, 1977

[54] TRANSMISSIVE END SEAL FOR LASER TUBES

[75] Inventors: David L. Wright, Palo Alto; John P. Goldsborough, San Jose, both of Calif.

[73] Assignee: Spectra-Physics, Inc., Mountain View, Calif.

[21] Appl. No.: 692,858

[22] Filed: June 3, 1976

[51] Int. Cl.² ............................................. H01S 3/02
[52] U.S. Cl. .............................. 350/319; 331/94.5 D
[58] Field of Search ....................... 331/94.5; 330/4.3; 350/319, 320

[56] References Cited

U.S. PATENT DOCUMENTS

| | | | |
|---|---|---|---|
| 3,555,450 | 1/1971 | Rockwell, Jr. | 331/94.5 D |
| 3,715,684 | 2/1973 | Biet | 331/94.5 C |
| 3,717,823 | 2/1973 | Abdale et al. | 331/94.5 D |

*Primary Examiner*—William L. Sikes
*Attorney, Agent, or Firm*—Flehr, Hohbach, Test, Albritton & Herbert

[57] ABSTRACT

Transmissive crystalline materials, such as sapphire and quartz, are used as end members for laser tubes. Crystalline quartz end windows are hard sealed to a metal end bell of special construction attached to the tube.

10 Claims, 4 Drawing Figures

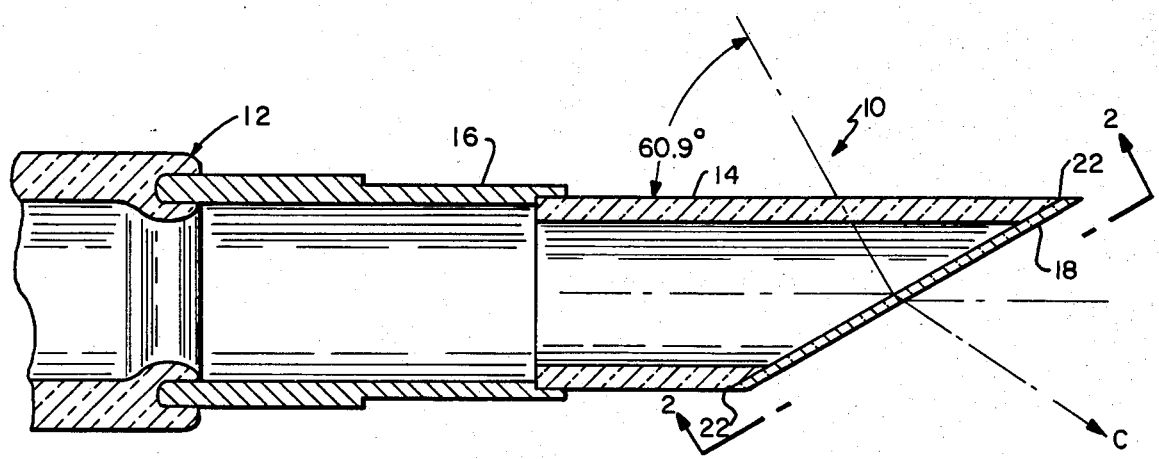
FIG.—1
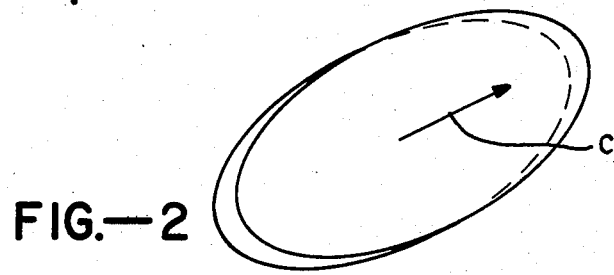
FIG.—2
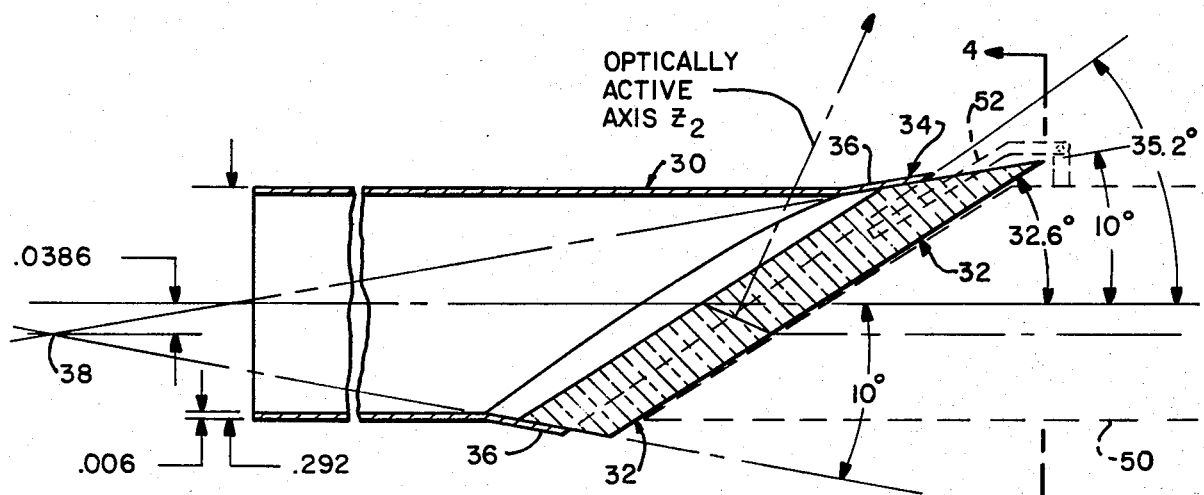
FIG.—3
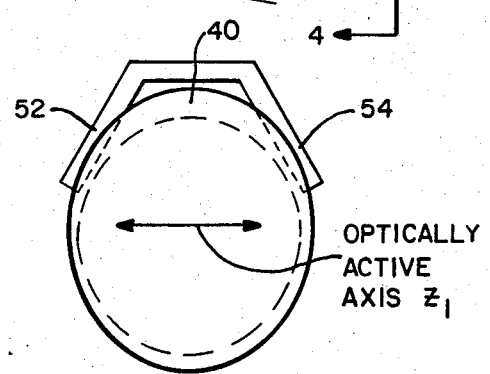
FIG.—4

TRANSMISSIVE END SEAL FOR LASER TUBES

BACKGROUND OF THE INVENTION

This invention relates to end seals for laser tubes and particularly to transmissive end windows having enhanced stability and improved thermal properties.

Heretofore, it has been common to manufacture certain gas laser tubes with Brewster window end seals through which radiation developed within the tube is taken for performing useful functions. Such windows have been located at the Brewster angle in order to enhance the efficiency of the tube and prevent unwanted reflections. Materials for such windows have included fused silica. Such fused silica windows can be hard sealed to a laser plasma tube made of the same material by spreading a thin layer of glass frit to the end of the tube to which the fused silica window is impressed so that the glass sealant interposed between the silica tube and the silica window is compressed into a very thin layer upon application of heat. It is also possible to attach such windows by epoxy.

It is found that UV emissions within the tube tend to darken fused silica in the same manner that it is darkened by solarization. Such darkening may be very small and even unobvious to the naked eye, but nevertheless produces an absorption which in turn results in thermal heating of the window. Furthermore, thin films of contamination are often developed on the inner surface of the window which can also cause absorption and heating. In general, the thermal conductivity of fused silica is not adequate to permit dissipation of the heat caused by absorption from the foregoing causes before thermal gradients of such magnitude are created with fused silica windows as to cause undesirable optical gradients and changes in its optical properties. Specifically, the thermal gradients change the index of refraction slightly producing distortion in the wave front of the resulting beam and degradation of mode purity and also causes additional loss of power through diffraction of the beam as it passes out of the laser cavity. There is, therefore, a need for a new and improved end window for use in terminating the light output end of laser plasma tubes.

SUMMARY OF THE INVENTION AND OBJECTS

It is a general object of the present invention to provide a transmissive end seal for a laser plasma tube from which light is to be taken which will eliminate the above limitations and disadvantages.

A further object of the invention is to provide an end seal and window for a laser tube which has an enhanced thermal conductivity and reduced sensitivity to UV absorption.

A further object of the invention is to provide an end seal and window of the above character which in one form is particularly adapted for being hard sealed to the remaining plasma tube elements. By hard sealed, it is meant the creation of hermetic seal by which the optically transmissive material of the end window is attached directly to a metal, ceramic, or glass tube without the use of carbonaceous bonding materials. Such seals usually utilize glass frit or other non-carbonaceous bonding techniques.

In accordance with the present invention, the laser tube is terminated at the end to be sealed by an end bell which forms an opening or end face at that end of the tube for receiving a window. The end bell is provided with a surface which will support the end window in an appropriate relation to achieve the critical Brewster angle geometry. The window itself is made of a crystalline material, such as crystalline sapphire or crystalline quartz, which materials are usually grown artificially in order to obtain maximum optical purity. The window is attached to the end bell in one embodiment of the invention by an epoxy sealant. In another embodiment of the invention a hard seal configuration is shown by which the window and end bell of the tube are conformed in portions of their configuration to the surface of a cone tapered inwardly in the direction of the tube so that the window can be seated in the end bell, the conical interface geometry being useful for establishing both good thin sealing area between the parts and for facilitating alignment therebetween. The materials crystalline sapphire and crystalline quartz have enhanced thermal conductivity compared to fused silica and are obtainable in high purity state to thereby avoid UV darkening. By increasing the thermal conductivity using crystalline material and simultaneously reducing the UV absorption with the same material, it is found that the problem of thermally induced optical degradation of performance can be reduced below acceptable limits.

The crystalline quartz embodiment of the present invention also features use of a bell-shaped end member made of metal which is constructed and arranged to form a hard seal with the quartz despite the significant difference in thermal expansion characteristics.

In accordance with the present invention, the crystalline end windows are oriented with their optically active (if any) axes of cut and polish as well as that of optical symmetry in a plane perpendicular to the optic axes of the plasma tube.

These and other objects and features of the invention will become apparent from the following description and claims when taken in conjunction with the accompanying drawings, in which:

BRIEF DESCRIPTION OF THE DRAWINGS

FIG. 1 is a side view in longitudinal cross-section showing an end seal and window for a laser plasma tube constructed in accordance with the present invention utilizing crystalline sapphire;

FIG. 2 is an end view illustrating the construction of the sapphire window taken along the line 2—2 of FIG. 1;

FIG. 3 is a side view in longitudinal cross-section of an end seal and window for laser plasma tubes constructed in accordance with the present invention utilizing a window made of crystalline quartz; and FIG. 4 is an end view taken along the line 4—4 of FIG. 3.

DETAILED DESCRIPTION OF THE PREFERRED EMBODIMENTS

Referring now to FIG. 1 there is shown one form of end seal and window constructed in accordance with the present invention utilizing crystalline sapphire. As shown, one end 10 of the laser plasma tube 12 is terminated in a section of cylindrical tubing 14 made of crystalline sapphire which is attached to the laser tube by a cylindrical Kovar type metal seal 16. The end 18 of the sapphire tubing is cut at an angle of about 60.9° to the optic axes of the tube and opens outwardly of the tube. The end bell is made of crystalline sapphire to take advantage of its anisotropic thermal properties; however, since it does not interact with the light created within the plasma of the tube, no particular optical requirements are placed on this member.

The end cut made on the tube defines a plane in space the normal to which is 60.9° to the optical axes of the plasma tube. The crystalline structure of the bell is arranged so that its optical axes, i.e., the neutral optical axes, lies in the same place as defined by the axes of the cut at the end and that of the tube. This plane will be referred to hereinafter as the reference optical plane of the structure and is chosen by criteria to be hereinafter discussed.

A window 20 constructed of crystalline sapphire is bonded to the end of the tube as with glass frit at 22. The window is constructed of a planar disc of the material having a thickness of approximately ½ millimeter. The neutral optical axis of the window and the normal to the surface thereof are oriented indentically with respect to the reference optical plane as previously described for the end bell itself. Conveniently, the window may be shaped and configured as illustrated in FIGS. 1 and 2 so as to conform to the end bell without overlapping edges. This facilitates attachment and bonding with a thin layer of frit. By orienting the optical axes of the sapphire tube 14 to coincide with that of the window, the anisotropic thermal effects which occur within the window in operation and heating of the structure as a whole occur in such a way that differential strains and resulting stresses which might otherwise develop between the window 20 and the end bell 14 are avoided since their thermal properties are substantially the same throughout the plane of bonding.

Reference is made now to FIGS. 3 and 4 which illustrate a form of an end bell 30 and window 32 constructed in accordance with the present invention utilizing crystalline quartz and configured for a non-carbonaceous hard seal or bond between the window and the bell. Thus, an end bell is preferably of OFHC annealed copper or other ductile low vapor pressure material (silver, gold, nickel) having the general form of a cylinder. The bell is cut at one end to an angle of 35.2° to axis of the tubing which axis is coincident with the optical axis of the plasma tube to which it is joined, such joinder being made, for example, by any suitable attachment structure such as brazing to Kovar which is fused to the tube body and brazed to stainless steel flanges which are gasket-sealed to the tube body, or by direct housekeeper seal to the tube body.

The end of the copper bell is formed with a 10° outward conical flare at 36. In order to accommodate the dislocation lengthwise between the upper and lower portions, the flare is constructed with the apex of the related cone displaced below the optical axis of the tube and located at 38. The reason for the displacement is evident from an elementary geometrical construction upon the constraints that the upper and lower extremes of the general elliptical inner section between the cylindrical tubing and a cone have an interfacing surface therebetween converging inwardly of the plasma tube at an angle of about 10°. The crystalline quartz window 32 is provided with opposed planar parallel surfaces, defined by thickness of approximately 2 millimeters. The periphery of the window is ground with a conical surface 40 lying along an elliptical path of intersection with the conical configuration of the flared end bell. Thus, the window appears from a position normal to its front and back surfaces to have the conically ground outer edge.

The crystalline quartz window has an optically active Z axis which is arranged to lie in an optical reference plane perpendicular to the path of the light beam passing through it. This is perpendicular to the plasma tube axis in one alternative $Z_1$, as shown in FIG. 4, or perpendicular to the refracted light path inside the window as shown in FIG. 3 at $Z_2$. The inner relative dimensioning of the parts, i.e., the minimum inside diameter of the tubing versus the inner inside diameter of the window, are so arranged so that the window cannot pass within the tubing, but is blocked and supported upon the convergence of the flared portion 36 of the tube. The parts are assembled in suitable jig 50 apparatus for supporting the window on fingers 52, 54 and the parts are then brought together and fused at an elevated temperature, the flared surface of the end bell having been previously coated with glass frit. In this way, a compliant seal is formed by the thin ductile copper metal tube which accommodates differential thermal expansion of the crystal quartz material. By constructing the seal in the manner shown, it is possible during the baking operation to exert pressure between the window and the end bell to thereby squeeze the molten glass therebetween to a thin, high-strength film capable of accommodating the thermal expansion that takes place between the parts during subsequent operation.

In general, the cut of the cyrstal is chosen as follows from orientations that will work. It is preferred to choose any cut that will make the optic axis or the neutral Z axis perpendicular to the direction of the pass of the light through the window. This can occur at an infinte number of angles, including perpendicular to the light path shown in FIG. 3 or perpendicular out of the drawing or anywhere inbetween. One should note, however, that the optic axis is optionally active and will cause a twist in the light if the beam is near to the optic axis, causing light to become elliptically polarized. However, if the cut is chosen perpendicular to the optically active axis, and one other axis is aligned with the polarization vector of the light (vertical, in the drawings), no undesirable effect of turning the polarization from linear into elliptical will occur. Once this orientation is achieved, that defines an effective index of refraction and the Brewster angle. However, there are still two indices left in crystalline quartz, but only one left in sapphire. After the first axis is positioned perpendicular, one of the other axes should be placed in line with the vertical polarization vector to be propagated. Thus, one axis is set with regard to the optical axis of the tube and the other one of the other axes of the crystal is set with regard to the Brewster angle.

The arrangement of FIGS. 3 and 4 is formed with a relief in that the angle of cut of the tapered copper end bell is 35.2° whereas the angle of orientation of the window is 32.6°. This exposes part of that longer upper tip of the window for use in attaching parts while it is jigged and fixtured. It is not essential, but as a practical matter it is useful because it clears a space at the top of the window. In this way one side of the window becomes longer than the other, and room is provided to put the sealing interface on and to leave some space for mounting, clamping or fixturing.

The 10° flare chosen for the end bell is selected on the following considerations. One would like for the tubing to possess maximum flexibility so that the stress required to deform the copper tubing to follow the quartz is minimum. The objective is to have the strength of the glass frit interface be sufficient to pull the copper and maintain it in contact with the quartz window, even though the copper and the quartz do not expand and contract together. In order for the copper to have minimum radial strength, it should be as cylindrical as possible. But, in so doing, one cannot obtain a perfect interface fit because of tolerances. A certain flare is provided as a means of getting a 0 clearance fit consistant with a minimum stress. If the angle is steeper, one approaches the case of a flat disc of copper which is much harder to compress.

The flare angle is chosen as the smallest angle which will just meet the tolerance requirements. 10° has been found satisfactory to obtain a reliable ½ to 1 mm. width of glass frit seal. This amount of flare is fairly easy to construct and, as the window is also flared to the same degree, there will be somewhere a nearly perfect, close fitting match between the parts, yet 10° of flare is not so high that it increases the geometrical strength properties and stresses the copper adversely.

At the other extreme in which one interfits a cylindrical window into a cylindrical tube, one requires tighter tolerancing on both parts. Thus, while 10° is somewhat arbitrary, it is chosen under the above guidelines. 15° and 5° would work, but 15° would strengthen the copper and increase thermally induced stress, while 5° would make it harder to make the parts match.

While the conical outer periphery of the crystalline window is closely matched to the conically outwardly facing end bell and, therefore, is somewhat self-aligning thereto; precision alignment during a firing operation is desirable and is easily accomplished with the present configuration. Thus, as shown in the FIGS. 3 and 4, mounting fixture 50 is provided into which the window 32 is slid upwardly and held. The mounting fixture consists of a section of tubing 56 cut to the 32.6° angle to the axis that is desired. The tubing has brazed thereon a pair of fingers 52, 54 serving as a small mechanical clamp which extends upwardly from each side and curve outwardly and downwardly in spaced relation to the end face of the tubing as shown in FIG. 4. These fingers clamp the conical edge 40 of the crystal window, and, since the latter is wider thereat because of the taper, the fingers are able to push and to hold the window against the face of the tubing 56 where it is retained in position during firing operations. After the window is so positioned, the tubing of the end bell is aligned with the tubing of the clamping jig to bring this pair together in substantially precise alignment and abutment.

As so aligned, the parts are brought together and urged into intimate contact with each other, the importance of which will now be explained in greater detail. As is known, the theoretical listed book strength of glass is extremely high. However, the gross strength of glass in bulk is reduced very substantially as the dimension of the glass is increased. This is due to structural defects in the glass caused by dislocations and other structural faults which occur statistically with high probability as glass thickness increases. Accordingly, it is important in the present seal to utilize glass in such a sufficiently thin layer that its inherent strength properties are capable of exceeding the bulk strength properties of the associated window and tubing materials which it joins so that the glass seal itself will be able to stress the copper tubing into conformance with the dimensional changes caused by thermal expansion of the window. In order to achieve such strength, the seal must be very thin and the following is given as an example of a thin seal which has been found structurally satisfactory. The surface irregularities of each of the parts, i.e., the end bell outwardly facing taper and the conical outer periphery of the end window, are made, for example, less than about 10 microns and preferably less than about 2 microns. The parts are urged together with the interposed glass frit and maintained in urged condition while fired so that the frit melts and flows into the microscopic voids between the parts. In this condition, the surface roughness of the two parts is brought into contact and the film is reduced to one of approximately 2 to 10 microns (20 microns maximum). At this thinness, adequate strength is found to exist in the glass seal for the foregoing purposes.

The optical quality of the crystal materials used in the present invention and the selection of such materials is mainly a matter of economics and availability of crystalline materials of adequate purity. High grade optical crystalline materials can probably be made from many basic and well-known materials besides sapphire and quartz, the examples set forth herein. Other examples would include calcium chloride, magnesium chloride, lithium chloride, magnesium oxide and spinel ($MgO \cdot Al_2O_3$). However, present readily available sources are substantially limited to quartz and sapphire. These materials have received wide research and a high degree of development due to their prior industrial applications for other purposes. In the case of sapphire, large quantities of crystalline sapphire have been utilized in atomic energy applications as high strength radiation resistant windows; while high purity crystalline quartz has existed for precision applications in the electronic industry. Sapphire windows utilized in the present invention that have been satisfactory include The Linde Co., a Division of Union Carbide, Etalon grade sapphire or the equivalent from Crystal Systems of Salem, Mass. Quartz of suitable optical quality has been obtained from Sawyers Research Products Company, Inc. of Eastlake, Ohio. In general, the type of quartz is the premium Q optical grade quartz which is usually double grown; that is, natural quartz of fairly high purity which is crushed and grown from a high temperature solution for first purification and then recrushed and regrown to obtain an extremely high pure crystalline quartz material.

These materials must meet certain specifications for resistance to UV radiation damage for use in the present invention, and the following has been found to be a satisfactory test for UV damage of such materials. Radiation at the following dose-time equivalent is applied to the material as follows: $10mw/cm^3$ for 200 hours at 1,500 angstroms. Thereafter absorption is measured at 3,500 angstroms and must be found to be less than 0.1°/0 per millimeter. While the figure of 1,500 angstroms is given as a dose for test purposes, frequencies in the range of 2,500 to 1,100 angstroms are satisfactory. While the foregoing would appear to be a destructive test, any material which can pass this test can be utilized in the present invention without fear of failure, and, of course, sampling techniques with regard to given batches would eliminate the need for testing more than a relatively small amount of the material used.

Although the present invention has been described with particular reference to its application to UV lasers, there are many lasers which will benefit from utilization of the present invention, i.e. those lasers which possess more than one line with significant power densities. Thus, lasers that operate below about 4,000 to 4,500 angstroms have absorption bands induced by UV radiation that are stronger, and, as the wavelengths are reduced toward 3,500 angstroms and lower values and power densities are increased, the invention will find greater and greater application. Examples are the argon laser operating at 3,500 angstroms, and Ne at 3,300 angstroms. In addition, there are lasers that also produce radiation at wavelengths shorter than 4,000 angstroms, as to which the present invention could also be applicable. In that connection, the present invention is not restricted to gas plasma layers nor to electron excitation of such gas plasmas, for it will also find application in liquid lasers and in those excited by other means, as for example E-field excitation.

Thus, there has been disclosed herein materials which, although dissimilar from that made for laser tubes in general, have nevertheless been adapted to a geometry which is capable of being sealed to such dissimilar materials and thereafter remaining operative over a wide temperature range. In addition, the disclosed materials are relatively low in cost and can be used in such a way that only low strain levels are induced in the final optical properties of windows constructed of the presently selected materials. It is a particular contribution of the present invention that the quartz crystal sealing technique as provided herein is capable of high durability and high vacuum seal. For, there may be other ways to make a vacuum seal of crystalline quartz to metal other than as herein disclosed and described, but the resulting strain that is induced in the quartz would probably lessen its usefulness as a laser window and thick sealing techniques which could be utilized to solve the temperature environment problems would probably not survive as a laser window because of induced strains affecting the optical properties.

By employing the crystalline materials as shown and described herein, it has been found possible to construct a laser plasma tube and seal end window of extremely high quality which is relatively insensitive to development of UV darkening and which because of its improved and increased thermal conductivity dissipates any heat therein to its extremes sufficiently readily so as to substantially reduce optical inhomogenities induced by thermal gradients to an acceptable level.

To those skilled in the art to which this invention pertains many adaptations and modifications thereof will occur. Accordingly, the scope of the present invention should not be taken as limited by the specific disclosure herein except as indicated by the accompanying claims.

What is claimed is:

1. In a transmissive end seal and window for a laser plasma tube; bell means having an opening in one end of said tube and having a surface about said opening in the form of (a conically and) an outwardly facing opening (flare) flared portion adapted to receive a light transmissive window therein, window means adapted to be placed into said flared end of said bell means for forming sealing engagement therewith in closed relation against the surface thereat, said window means having a peripheral surface shaped to conform with and to mate with the outwardly flared portion of said bell so that said bell means and said window, when urged together, lie in contact therebetween throughout the closed path defined by said flared portion, glass frit forming a thin bond between said window and said end bell means about said path, said members being attached by being urged together in the presence of said frit and subjected to high temperature baking so as to melt said glass, which is thereafter cooled, said window means being constructed of a material having a high purity crystalline structure undamaged by, and transmissive to the radiation developed within said plasma tube, said window means having enhanced thermal conductivity due to its crystalline structure.

2. A seal and window structure for laser plasma tubes as in claim 1 in which said end bell is metal, said window is crystalline quartz, and further in which said end bell is configured to form a compliant seal with said window.

3. A seal and window structure for laser plasma tube as in claim 1 in which said metal is copper and said window is crystalline quartz.

4. A seal and window for a laser plasma tube as in claim 1 in which said bell and said window are constructed of crystalline sapphire.

5. A transmissive end seal and window as in claim 1 in which the mating surfaces are conical to permit the same to be urged into intimate contact to obtain a perfect fit to each other.

6. A transmissive end seal and window as in claim 1 in which the flare is constructed at an angle between 5° and 15° to the axis of the tube.

7. A transmissive end seal and window as in claim 1 in which said flare is 10° and said window is constructed with a mating 10° conical outer periphery.

8. A transmissive end seal and window as in claim 1 in which said flared portion of said bell means and said mating periphery of said window are provided with finishes (lying in a ) having surface irregularities (range) of less than about 10 microns.

9. An end seal and window as in claim 1 in which said crystalline material is crystalline quartz, said crystalline quartz being of high purity, doubly grown from crushed natural quartz of high purity.

10. A transmissive end seal and window as in claim 1 in which said crystalline material is sufficiently pure that it will withstand exposure to a dose of radiation in the range from about 2,500 to 1,500 angstroms for 200 hours at 10 milliwatts per square centimeter exposure density and therafter be capable of no greater than 0.1% per millimeter absorption at 3,500 angstroms.

* * * * *

UNITED STATES PATENT OFFICE
CERTIFICATE OF CORRECTION

Patent No. 4,063,803　　　　　　　Dated December 20, 1977

Inventor(s) David L. Wright and John P. Goldsborough

It is certified that error appears in the above-identified patent and that said Letters Patent are hereby corrected as shown below:

Column 4, line 30, delete "pass" and substitute therefor
-- path --

Column 4, line 35, delete "optionally" and substitute therefor -- optically --

Column 6, line 43, delete "pure" and substitute therefor
-- purity --

Column 6, line 52, delete "0.1°/0" and substitute therefor
-- 0.1% --

Column 7, line 13, delete "E-field" and substitute therefor
-- E-beam --

Column 7, line 54, delete "(a conically and)"

Column 7, line 55, delete "(flare)"

UNITED STATES PATENT OFFICE
CERTIFICATE OF CORRECTION

Patent No. 4,063,803　　　　　　　　　　Dated December 20, 1977

Inventor(s) David L. Wright and John P. Goldsborough

It is certified that error appears in the above-identified patent and that said Letters Patent are hereby corrected as shown below:

Column 8, line 43, delete "(lying in a)" and "(range)"

Signed and Sealed this

Twelfth Day of December 1978

[SEAL]

Attest:

RUTH C. MASON
Attesting Officer

DONALD W. BANNER
Commissioner of Patents and Trademarks